United States Patent [19]

Engles et al.

[11] Patent Number: 5,049,013
[45] Date of Patent: Sep. 17, 1991

[54] MIXER APPARATUS

[75] Inventors: David J. Engles, Springwater; Daniel J. Bentley, Rochester; Gary A. Quinter, Penfield; Ronald N. Salzman, Rochester, all of N.Y.

[73] Assignee: General Signal Corporation, Stamford, Conn.

[21] Appl. No.: 615,765

[22] Filed: Nov. 19, 1990

[51] Int. Cl.⁵ .............................................. B23C 1/06
[52] U.S. Cl. ..................................... 409/231; 279/35; 279/77; 279/89; 408/226
[58] Field of Search ................. 409/231, 233; 408/226, 408/239 R; 279/16, 15 G, 29, 35, 67, 77, 83, 89, 106, 79

[56] References Cited

U.S. PATENT DOCUMENTS

| 1,862,337 | 6/1932 | Emrick . | |
|---|---|---|---|
| 2,387,339 | 10/1945 | Meyer | 408/226 |
| 2,667,357 | 1/1954 | Andreasson . | |
| 2,854,238 | 9/1958 | Kennell . | |
| 3,053,118 | 9/1962 | Lavallee | 408/226 |
| 3,073,635 | 1/1963 | Schaefer | 279/77 |
| 3,576,076 | 4/1971 | Weissman . | |
| 4,013,154 | 3/1977 | Brown . | |
| 4,064,708 | 12/1977 | Breads . | |
| 4,108,259 | 8/1978 | Dixon . | |
| 4,146,240 | 3/1979 | Nielsen . | |
| 4,366,722 | 1/1983 | Hasler . | |
| 4,491,443 | 1/1985 | DeCaro | 279/79 |
| 4,551,117 | 11/1985 | Kunz . | |
| 4,643,609 | 2/1987 | Biass . | |
| 4,682,780 | 7/1987 | Kurama . | |
| 4,784,543 | 11/1988 | Mitchell et al. . | |
| 4,810,139 | 3/1989 | Regan . | |
| 4,836,708 | 6/1989 | Chambers et al. . | |
| 4,842,439 | 6/1989 | Caldwell et al. . | |
| 4,979,855 | 12/1990 | Babel | 409/231 |

FOREIGN PATENT DOCUMENTS

| 832373 | 1/1952 | Fed. Rep. of Germany | 279/89 |
|---|---|---|---|
| 2741994 | 3/1979 | Fed. Rep. of Germany | 279/89 |
| 921695 | 4/1982 | U.S.S.R. . | |
| 965612 | 10/1982 | U.S.S.R. . | |

Primary Examiner—Daniel W. Howell
Attorney, Agent, or Firm—Martin Lukacher; Milton E. Kleinman

[57] ABSTRACT

A mixer for liquids and liquid suspensions has a motor drive and housing which is portable and can be carried from tank to tank and attached to the tank where mixing is carried out. The housing depends from the yoke and contains a quill which is driven by the motor drive. A chuck mechanism is associated with the housing and quill to enable mixer impeller shafts to be held in assembled relationship in the mixer and readily removed and replaced with shafts having impellers specially adapted for the particular mixing application of interest. The chuck mechanism is operable even though the quill is hidden in the mixture housing.

30 Claims, 8 Drawing Sheets

MIXER APPARATUS

DESCRIPTION

The present invention relates to mixer apparatus, and particularly to mixer apparatus having an improved mixer impeller shaft chuck mechanism which enables installation and replacement of mixer shafts even though the chuck mechanism cannot be observed by the operator who is installing or removing the shaft.

The invention is especially suitable for use in portable mixers for mixing fluids and fluid suspensions where the mechanism for coupling the shaft to the mixer drive (the chuck mechanism) protected from inadvertant contact with human operators for enhanced safety and also is hidden from view within the mixer housing and especially where it is desirable that the chuck mechanism be in sealed relationship with the mixer housing so that it is not affected by the mixing environment. The invention has aspects which make it applicable to other uses wherever a high degree of assurance of adequate coupling between a shaft and a drive needs to be provided by the chuck mechanism interconnecting them.

U.S. Pat. No. 5,005,843, issued Apr. 9, 1991 in the names of S. Markle, W. Hutchings, M. Schutte, R. Howk and D. Engle, also relates to a chuck mechanism for detachably connecting a mixer impeller shaft to a mixer drive. That Patent discusses the general technological background of chuck mechanisms and the following documents are cited therein. Emerick U.S. Pat. No. 1,862,337; Andreasson U.S. Pat. No. 2,667,357; Kennell U.S. Pat. No. 2,854,238; Weissman U.S. Pat. No. 3,576,076; Brown U.S. Pat. No. 4,013,154; Breads U.S. Pat. No. 4,064,708; Dixon U.S. Pat. No. 4,108,259; Nielsen U.S. Pat. No. 4,146,240; Hasler U.S. Pat. No. 4,366,722; Kunz U.S. Pat. No. 4,551,117; Biass U.S. Pat. No. 4,643,609; Kurama U.S. Pat. No. 4,682,780; Mitchell U.S. Pat. No. 4,784,543; Caldwell U.S. Pat. No. 4,842,439; Chambers U.S. Pat. No. 4,836,708; Regan U.S. Pat. No. 4,810,139 and USSR Patent documents 21695 of Apr. and 965612 of Oct. 1982.

Many mixer applications require that the mixer shaft be firmly locked to the drive by the chuck mechanism. However, mixer designs may hide the chuck mechanism from view. It is therefore desirable that the mechanism itself provide assurance that positive locking take place. In some mixing applications, for example in photographic film manufacture, mixing is carried out in complete darkness. This requirement further exacerbates the problem of providing a chuck mechanism which assures that a firm connection of the mixer shaft to the mixer drive unit is obtained. It is also necessary that the chuck mechanism facilitate release of the mixer shaft to enable shafts to be interchanged.

A chuck mechanism which provides firm locking of the shaft to the drive does not allow the shaft to be released safely and easily when it is desired to do so, is not practical. However, the ease of releasing the shaft can present safety hazards so that a chuck mechanism which allows inadvertent or premature release of the shaft is also impractical. A still further problem is to warn the operator of the mixer that the installation of the mixer shaft has not been successfully accomplished. Then, the mixer can be shut off and the deficiency in the installation procedure corrected, thereby further enhancing the efficiency and safety of mixing operations.

Accordingly, it is the principal object of the present invention to provide improved mixer apparatus having features of design and construction providing solutions to the foregoing problems and obviating the above discussed disadvantages.

It is a further object of the present invention to provide an improved chuck mechanism, especially suitable for use in mixer apparatus, which enables a mixer shaft to be installed in driving connection with the motor drive unit of the mixer.

It is a still further object of the invention to provide a chuck mechanism which provides for safe handling of shafts, which mechanism is located internally of the bearing housing for the drive thereby eliminating exposure of operators to rotating parts of the chuck mechanism.

It is a still further object of the present invention to provide an improved chuck mechanism for mixer apparatus and the like which provides assurance of an adequate coupling or connection of the shaft to the drive unit of the mixer even though the mechanism itself may be hidden from view within the confines of the mixer housing.

It is a still further object of the present invention to provide an improved chuck mechanism for mixing apparatus which enables the chuck mechanism to be sealed from the environment in which the mixer is used.

It is a still further object of the present invention to provide an improved chuck mechanism for mixer apparatus which prevents inadvertent release of the mixer shaft from the chuck mechanism and enhances the safety of the operation of the mechanism in the installation and removal of the mixer shaft.

It is a still further object of the present invention to provide an improved chuck mechanism for mixer apparatus which provides a warning in the event that the shaft is not tightly engaged with the chuck mechanism.

Briefly described, a chuck mechanism for assembling a mixer impeller shaft with a mixer drive which embodies the invention has a housing in which the mechanism is enclosed. A quill, which term should be taken to connote any spindle to which the mixer drive is connected, is a tubular member, open along the axis of rotation thereof, in which the mixer shaft is received. A latch which is engagable with the mixer shaft when received in the quill opening, retains the shaft in the quill opening, the latch is pivotally mounted on the quill and presents an indicator surface facing outside of the quill. Manually actuable assembly means (suitably a set screw) is located in the quill and disposed in fixed spatial relationship with the indicator surface of the latch. Indicator means mounted in the housing is responsive to the indicator surface for indicating when the quill and the shaft engaged with the latch are disposed in alignment with the indicator so as to enable the assembly means to be actuated to assemble and lock the shaft and quill for conjoint rotation when driven by the mixer drive. The indicator means may be selected from devices which are magnetically, optically or tactily responsive to the indicator surface.

The foregoing and other objects features and advantages of the invention, as well as specific examples of embodiments of the invention, will become more apparent from a reading of the following description in connection with the accompanying drawings in which.

Figure 1:
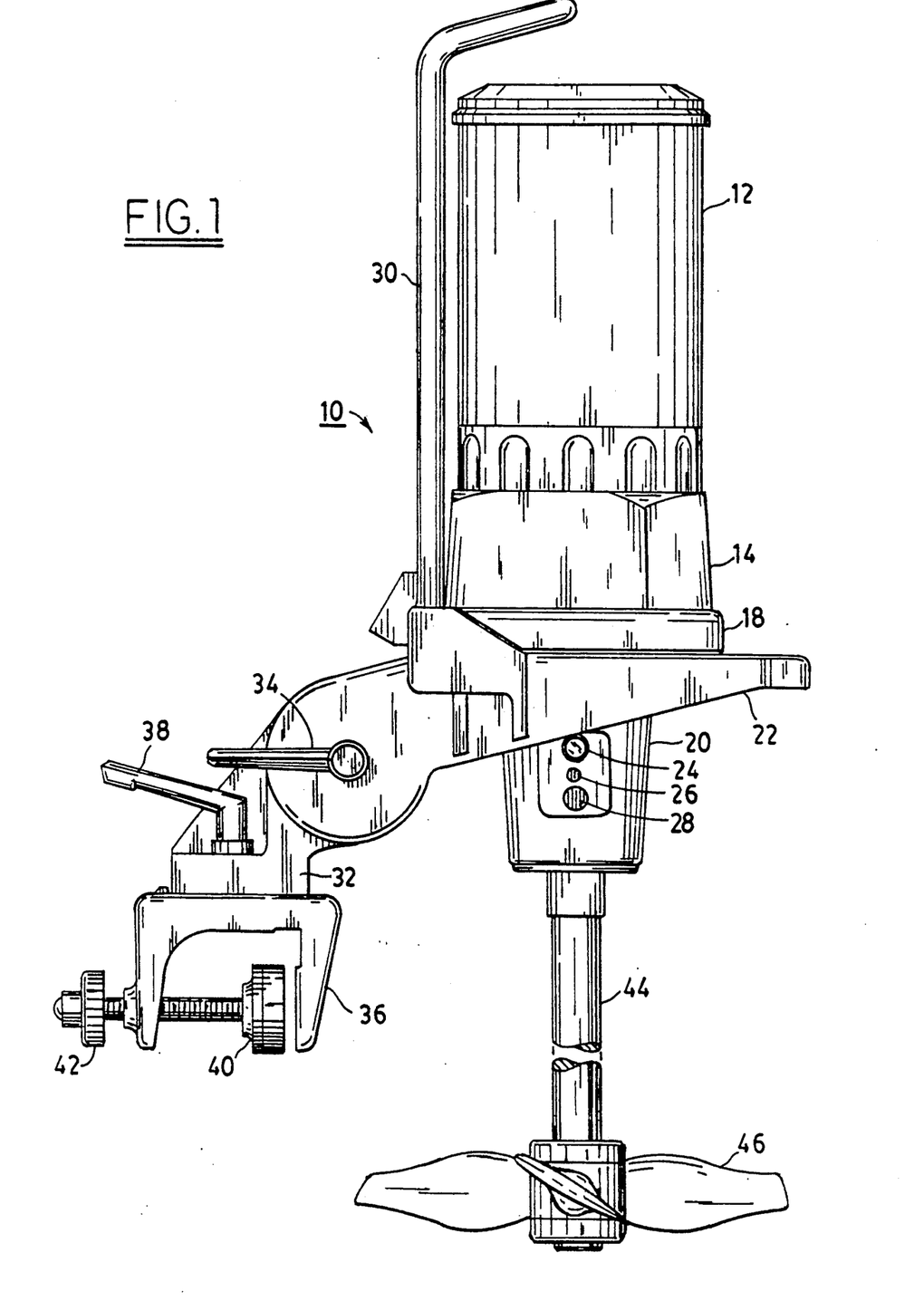
FIG. 1 is an elevational view of a portable mixer embodying the invention.
Figure 2:
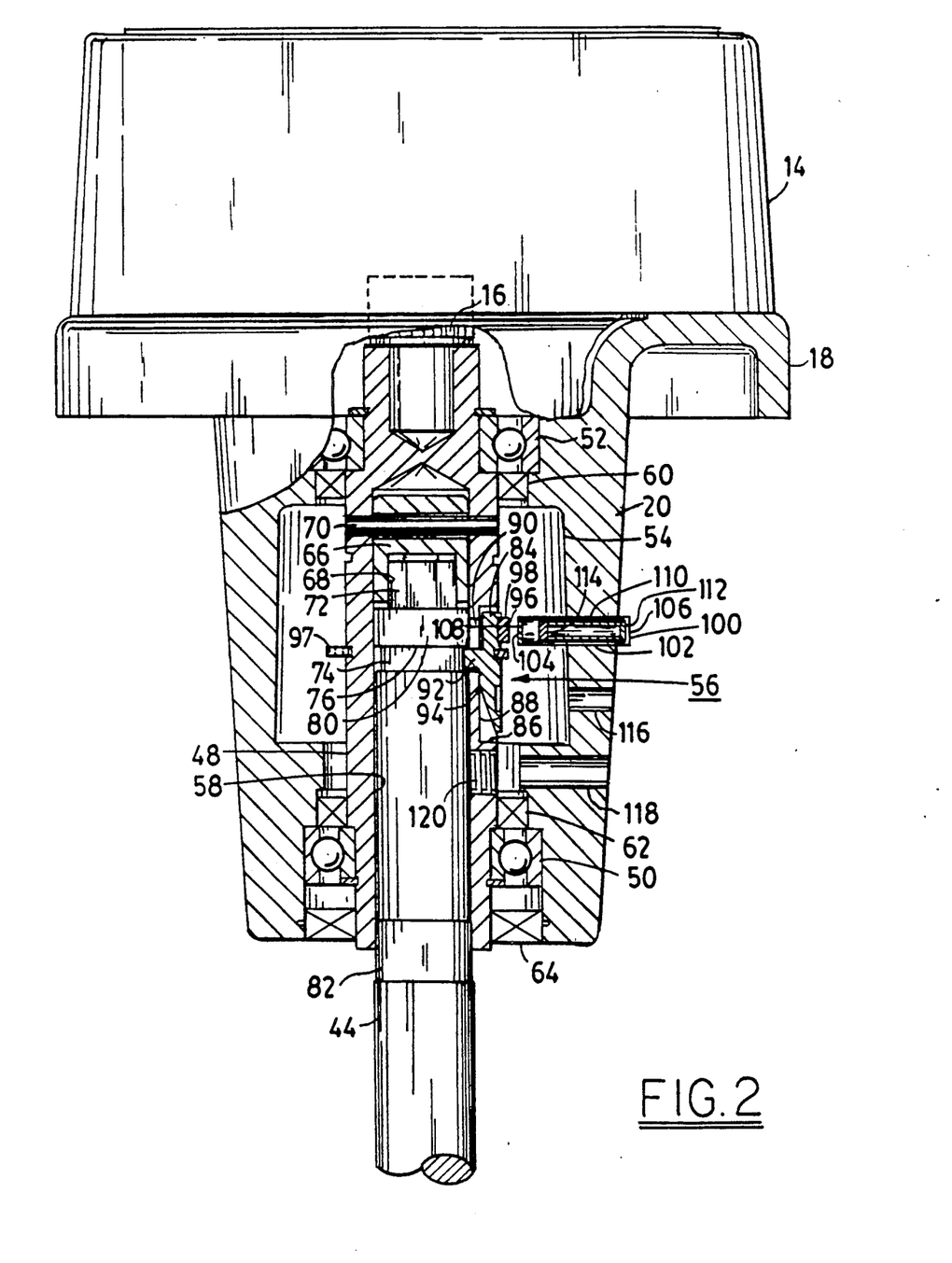
FIG. 2 is an enlarged fragmentary view of a portion of the drive unit and a chuck mechanism in accordance with a first embodiment of the invention.

Referring more particularly to FIG. 1 there shown a portable mixer apparatus 10 having a motor 12 assembled to a gear box in a housing 14. One of the gears 16 of the gear box is shown in FIG. 2. The mixer drive unit is made up of the motor 12, the gear box (when it is a gear drive unit) and the bearing housing 20. The motor and gear box 14 are mounted on top of a flange 18 of the bearing housing 20. The housing 20 is generally oblong in cross-section and below the flange 18, and extends through a mounting yoke 22. The mounting yoke has an oblong keying hole (not shown) which orients the drive unit and housing 20 so that an indicator 24 and two holes 26 and 28 aligned with the indicator 24, are presented along a side of the mounting yoke 22. Bolts (not shown) extend through the motor housing 12, the gear housing, 14 and the flange 18 into the mounting yoke and connect these elements as an assembly.

The mounting yoke has connected thereto a handle assembly 30 which enables the mixer apparatus 10 to be portable so that it can be carried from tank to tank wherever mixing is desired. The yoke 22 is part of a pivot mechanism. It is rotatably connected to a pivot bracket 32 and pivotal along a generally horizontal axis on the bracket 32, thereby adjusting the angle of inclination of the mixer. A locking screw operating by a lever 34 clamps the yoke to the pivot bracket 32 when the desired angular orientation about the horizontal axis is achieved. The pivot bracket 32 is rotatable about a generally vertical axis on a clamp 36. A locking screw operated by a lever 38 locks the pivot bracket 32 in the desired angular position about the vertical axis. The clamp 36 has a clamping screw with a travel plate 40 which may be advanced or retracted by a handwheel 42. The clamp may be inserted along the top edge of a wall of the tank in which mixing is to be carried out, and clamped in place.

A mixer shaft 44 having an impeller 46 thereon depends from the housing 20. The shaft is sufficiently long to reach a desired displacement off the bottom of the tank. In a typical application the shaft 44 may be 1" in diameter.

As shown in FIG. 2, the housing 20 serves as a bearing housing and rotatably mounts a hollow quill 48 in ball bearings 50 and 52. An annular groove 54 in the housing 20 contains the chuck mechanism 56 which releasably holds the shaft 44 in the opening 58 of the quill. Running seals 60 and 62 seal the region defined by the groove 54. These seals may be attached to the housing. Another seal 64 is disposed around the lower end of the quill, that seal is also attached to the housing 20.

The drive gear, or if a direct drive from the motor is used, the motor shaft, is connected by a pin or a key (as shown in FIG. 2) or splines to the upper end of the quill 48 and rotates the quill when the motor is driven. The quill may also be rotated by hand for alignment purposes during installation of a shaft, after the shaft is inserted into the quill as will become more apparent as the description proceeds.

Figure 18A:
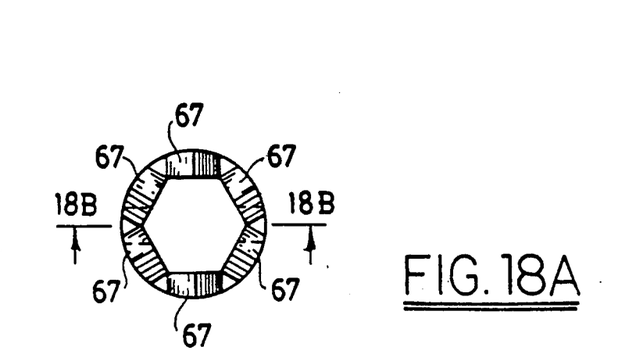
FIGS. 18A and B are respectively bottom and sectional (along line 18B—18B) views of another socket for use in the quill to receive the upper end of the mixer shaft.
Figure 18B:
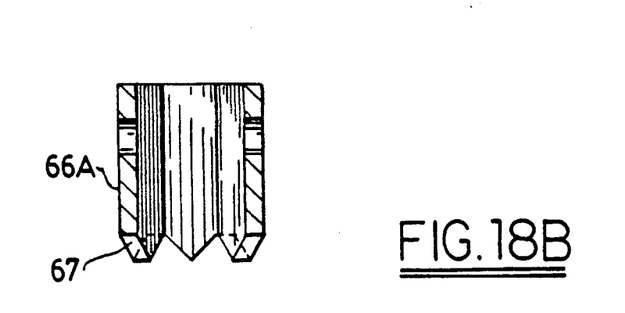

A socket 66 having a hex shape hole 68 floats on a cross pin 70 which extends diametrically through the quill. There is sufficient clearance by virtue of the outer diameter of the sprocket being smaller than the hole 58 in the quill 20 that the socket may float slightly (for example, ten-thousandths of an inch along the axis of the pin 70). This float facilitates alignment of the socket with a hexagonal head 72 on the shaft 44 (which may be a nut screwed onto the end of the shaft 44). Torque is transmitted through the quill to the shaft 40 by way of the head when the shaft is inserted into the opening 20. Alternatively, the socket 66A shown in FIGS. 18 A and B may be used. That socket has a crown shape of tapered teeth 67. When the flats of the head 72 enter the socket out of exact alignment with the flats internal of the socket, they are urged by the teeth 67 into alignment. This facilitates the entry of the head into the socket and makes the assembly self-aligning.

The shaft has a groove 74 which defines a rim 76. The shaft is also undercut between two contact pads (annular areas 80 and 82). This undercut (suitably ten-thousandths of an inch) facilitates the assembly and locking of the shaft 44 in the quill as will become more apparent as the description proceeds.

The chuck mechanism 56 has as a principal component a pivotal latch 84. This latch is disposed in a vertical groove 86 having a base 88. A hole 90 extends from the base 88 into the central hole 58 of the quill 48. A tang or tab 92 extends from the latch 84 into the groove 74 in the shaft 44. The latch 84 and particularly its tab 92 supports the shaft 44 at the rim 80 and holds the shaft axially in the quill, preventing it from falling out. This holding or latching action is obtained because the latch is a lever having a fulcrum 94 about which the latch pivots on the base 88 of the slot 86 which contains the latch. The latch is yieldably secured for such pivotal motion by a annular spring member provided by an expansible resilient metal ring 96 (sometimes called a "C" ring) which encompasses the quill and the latch 84 and extends into grooves therein.

The latch 84 has an indicator surface 96 in the embodiment of the invention illustrated in FIGS. 2 through 6. This indicator surface is provided by a disk 98 of permanent magnet material which is polarized in a radial direction with respect to the axis of rotation of the shaft. In other words, the surface 96 which faces outwardly from the quill may be a north magnetic pole while the surface of the disk 98 which is attached to the latch 84 is a south magnetic pole. See FIG. 6.

A magnetic indicator 100 is disposed in an opening in the housing 20 with its axis in a plane perpendicular to the axis of rotation of the shaft which extends midway through the disk 98. This indicator is a tube 102. The inside end 104 of the tube 102 extends into the groove 54 in the housing 20. The outside end 106 of the tube is also closed. The outside end 106 is made of optically transmissive material (preferably translucent white material which may be the material from which the tube 102 is constructed). The inside end 104 of the tube is provided by a disk of soft magnetic material, such as iron or other ferrous material.

Inside the tube is a member, preferably another tube 110 which is moveable radially of the shaft and quill within the outer tube 102. The outside end of the inner moveable tube 110 is made of, or has a coating of, fluorescent material so that it is visible through the end 106 of the outer tube when the ends 112 and 106 are in juxtaposition as shown in FIG. 2 and also in FIG. 6. The inside end of the tube is closed by a disk 114 of permanent magnet material which is polarized in the radial direction, but opposite to the polarization of the magnet disk 96 which is carried by the latch 84.

Figure 4:
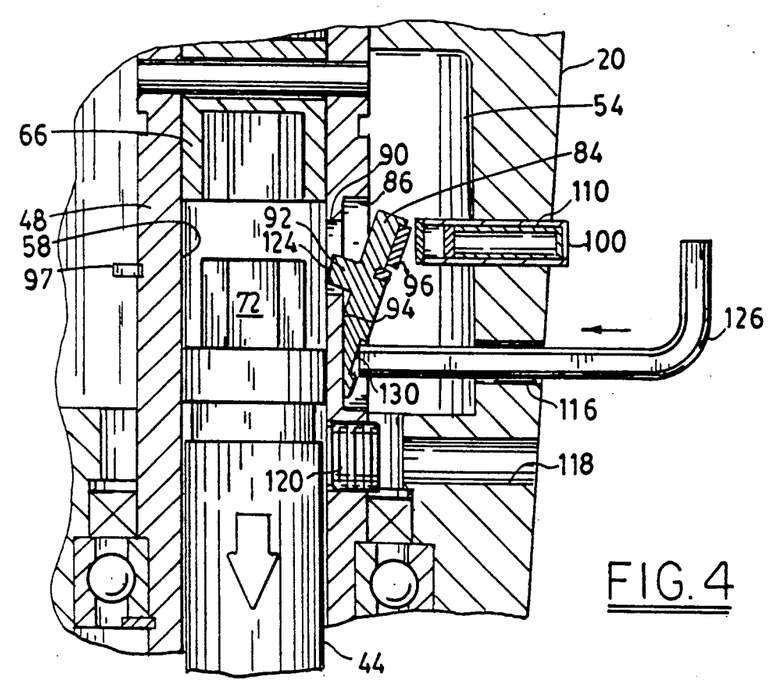

The housing 20 also has a radial hole 116 into the annular groove region 54 this hole 86 is located below the fulcrum 94 of the latch and provides a passageway for a tool for pivoting the latch when it is desired to release the shaft as will be discussed below in connection with FIG. 4. This hole 116 is visible at 26 in FIG. 1. Another hole 118 into the annular groove region 54, which is visible at 28 in FIG. 1, provides a passageway for a tool into manually actuable assembly means, provided by a set screw 120, in the quill 48. This assembly means set screw 120 is in predetermined spatial orientation with respect to the latch 84, and preferably is in vertical alignment with the latch to correspond to the vertical alignment of the indicator 100 with the hole 118. The operation of the chuck mechanism 56 will become more apparent from FIGS. 3 to 5.

Figure 3:
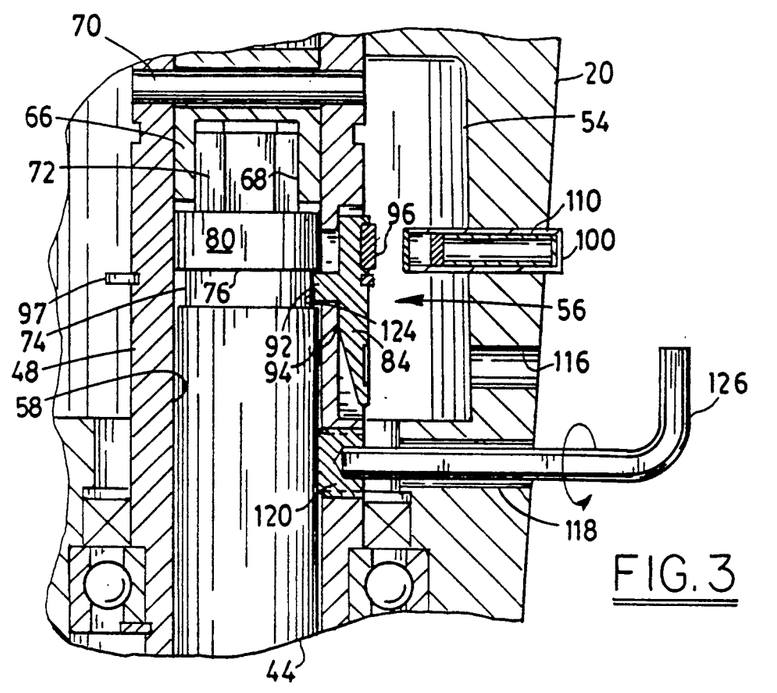
FIGS. 3 and 4 are fragmentary sectional views of the chuck mechanism taken while the shaft is being installed and released, respectively.

First the shaft 44 is inserted into the quill opening 48. The upper end of the shaft and of the pad section 80 is tapered or bevelled and pivots the latch 84 about its fulcrum 94 as the shaft 44 is inserted into the hole 58 in the quill 48. When the groove 74 in the shaft clears the pad 92, the tab 92 snaps into place in the groove 74. Preferably the inside surface 124 of the tab is beveled so as to facilitate its movement (in the counterclockwise direction as shown in FIGS. 3 and 4) to snap into the groove 74. The ring 96 expands as the latch 84 pivots. At this juncture the set screw 120 is backed off and extends into the area of the groove 54 as shown in FIG. 4. The groove 74 may be undercut approximately 0.040 inches from the outer diameter of the shaft as measured across the pad 80. This provides a rim area sufficient to hold up the shaft 44 on the tab 92. It will be observed that, when the shaft is held up on the tab, the upper end of the shaft at the head 72 and at the top of the tab 80 is spaced from the quill. This provides a safety feature in that the weight of the shaft prevents inadvertent pivoting of the latch 84 which might release the shaft inadvertently when the release of the shaft is not desired. It is necessary to lift the shaft 44 in order to enable the latch 84 to be pivoted so that the tab 92 can clear the rim 76, as can be accomplished by the use of a Allen's head wrench 126 or other tool, when it is desired to release the shaft in order to remove it, as for example when it is desired to interchange the shaft with another shaft having a different mixing impeller. This arrangement enhances safe handling of the shaft and operation of the chuck mechanism. The latch 84 may be called a clip, since it is yieldable and snaps into place.

Figure 5:
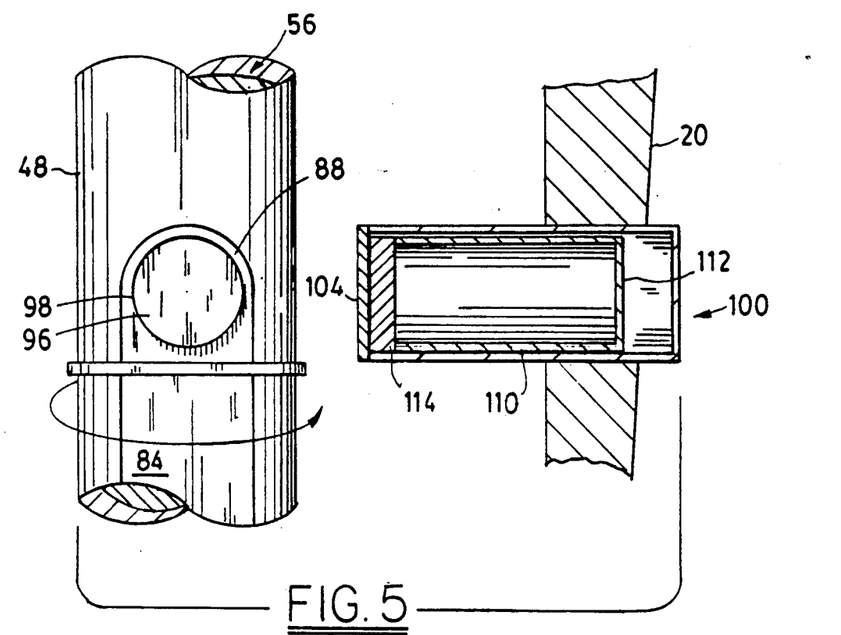
FIGS. 5 and 6 are schematic views illustrating the operation of the magnetically responsive indicator shown in FIGS. 3 to 6.
Figure 6:
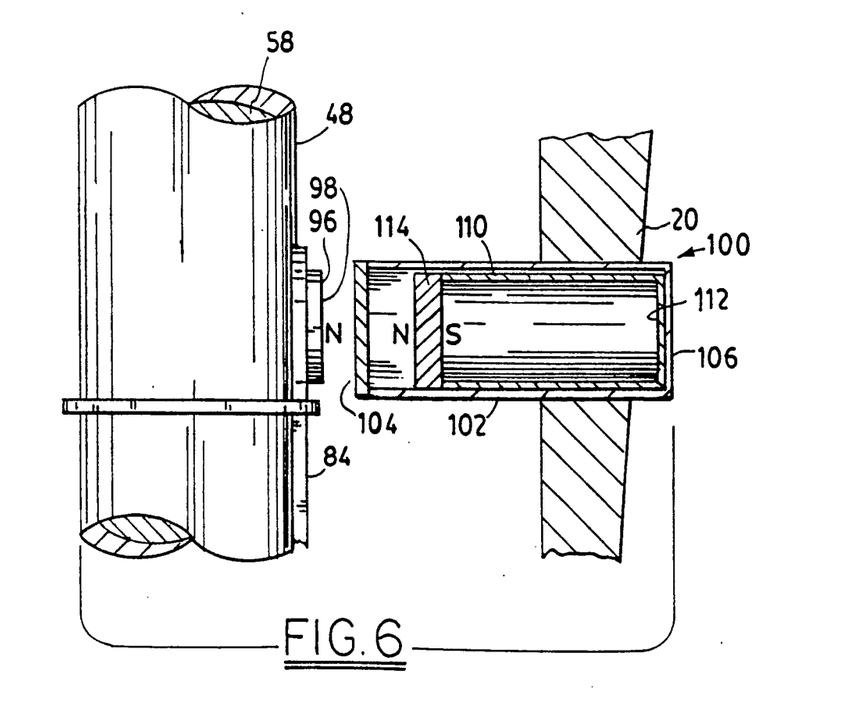

In order to manually actuate the set screw and lock the shaft 44 in assembled relationship with the quill, the tool 126 must be inserted through the opening 118. Radial alignment of the opening 118 with the set screw 120 is required. The quill is hidden from view. Such alignment is indicated using the magnetic indicator 100. As shown in FIG. 5 the quill is rotated by hand until the indicator surface 96 is in alignment with the end 104 of the indicator. The tube 110 carrying the fluorescent indicating surface 112, at the outer end thereof is normally maintained, by virtue of the attraction of the magnet 114 to the soft magnetic material disk 104, in the position shown in FIG. 5. When the quill is turned to the aligned position, the magnet 114 is repelled by the magnet 98 to bring the bi-stable, movable member 110 against the translucent end 106. The fluorescent indicating surface then becomes visible and the operator is assured that the quill and shaft are aligned so that the tool 126 may be inserted and the set screw tightened to lock the shaft to the quill. The undercut in the shaft assures that any burr raised by the screw 120 does not interfere with removal of the shaft 44.

To remove the shaft, the set screw 120 is loosened. Then the tool is moved into the opening 116. Preferably the latch 84 has a notch 130 which receives the end of the tool 126. Before the latch is pivoted, the shaft is raised so that the upper surface of the pad 80 and the head 72 are disposed against the lower end of the socket 66. Then the tool 126 is used to pivot the latch which releases the shaft and allows it to slide out of the opening 58 in the quill 48.

Figure 7:
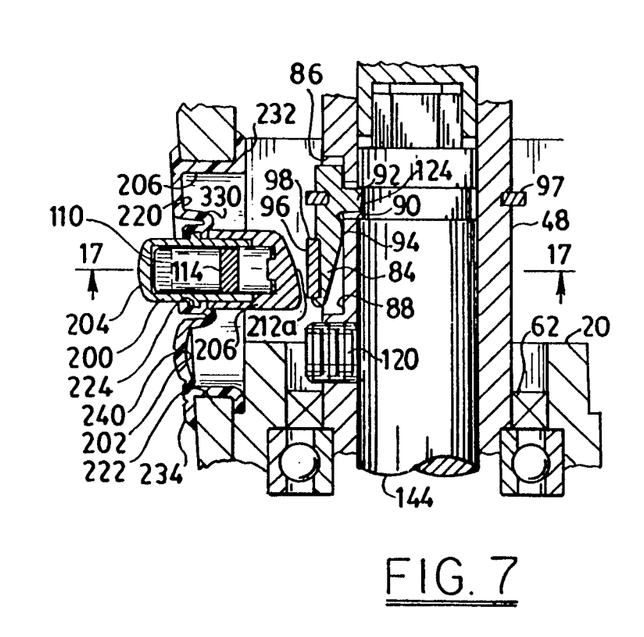
FIG. 7 is a fragmentary sectional view of a chuck mechanism in accordance with another embodiment of the invention.
Figure 13:
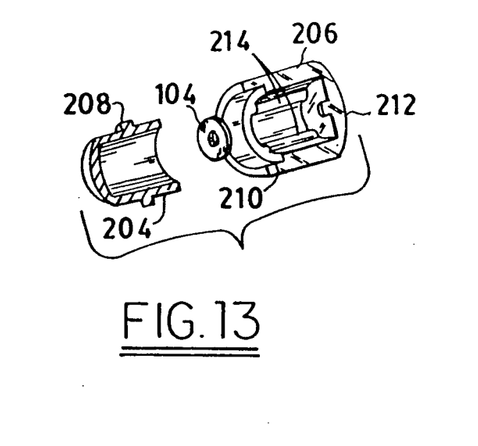
FIG. 13 and 14 are, respectively, exploded and fragmentary sectional views illustrating a magnetic indicator and button assembly of the type shown in FIG. 7.
Figure 14:
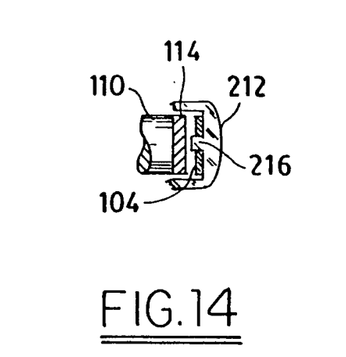

Referring to FIG. 7 there is shown another embodiment of the chuck mechanism using a magnetic indicator 200. Similar parts shown in FIG. 7 and in FIG. 1 through 6 are identified with like reference numerals. In FIG. 7 the latch 84 has the disk 98 of permanent magnet material attached to the latch below the ear providing the fulcrum 94 thereon. The indicator 200 then serves a dual function. First to indicate alignment of the set screw 120 with an opening 202 through which the Allen's head wrench may be inserted for tightening and loosening the set screw, and secondly as a button for depressing the latch 84 to release the shaft 44. The indicator 200 may be fabricated as shown in FIGS. 13 and 14 from 2 pieces 204 and 206. The piece 204 projects rearwardly outside an opening 206 in the housing 20 and is preferably made of optically transmissive material such as clear polyvinylchloride (PVC) plastic. The part 204 has a annular rib 208. It fits into a recess 210 in the other part 206. The other part has an inward end 212 which is preferably radiused and may have the tapered shape shown at 212a in FIG. 7. Axial ribs 214 define the path of the moveable member 110 of the indicator. The rear end of the member 110 is covered by fluorescent paint so that it is visible when the member 110 is magnetically repelled, which occurs when the indicator 200 is in alignment with the magnet 96 on the latch 84. A standard steel washer provides the body of soft magnetic material which normally attracts the body 110 (the magnet 114 then being in the position against the washer 104 as shown in FIG. 14). A post 216 provides a locator for the washer. The post serves as a stop for the member 110. The radiused end 212 has the feature of enabling the spinning magnetic disk to ride over the end 212 if contact is inadvertently made.

The opening 206 has mounted therein a plate 220 of elastomeric material such as resilient plastic. Plastic sold under the trademark "HYTREL" (a urethane-polyester) is suitable. This plate has a bezel 222 around its outer periphery and can be snapped into the opening and received around the ends of the walls of the housing which define the opening 206. Similarly an interior bezel 224 receives the annular rib 208 of the indicator 200. The plate 220 yieldably supports the indicator and provides a restoring force to the position shown in FIG. 7. Alternatively, a rigid plate and a spring biased actuator within a closed flexible nipple can be used.

Figure 11:
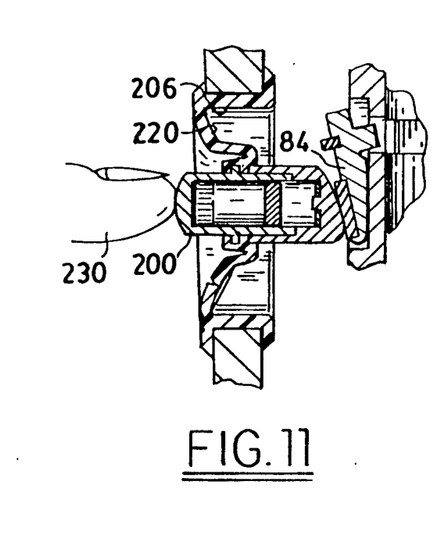
FIG. 11 is a schematic diagram of the embodiment shown in FIG. 7 illustrating the operation of the indicator as a button for releasing the shaft.

As shown in FIG. 11 the operators finger 230 depresses the button provided by the indicator 200 against the bias, restoring force of the flexural plate 220. The latch 84 can then be tilted to release the shaft 44. The inner top rim 232 and the outer bottom rim 234 of the bezel 222 may be somewhat higher than their adjacent rims to facilitate insertion and capturing of the plate 220 in the opening 206. A bend 236 in the plate 220 increases the strength of the flexural restoring force provided by the elastomeric material of the plate 220.

Figure 8:
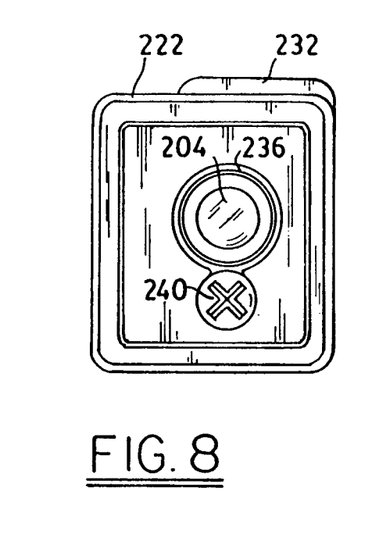
FIG. 8 is a end view showing a flexural mounting and cover plate having a bezel for mounting the alignment indicator in the housing of the chuck mechanism.
Figure 9:
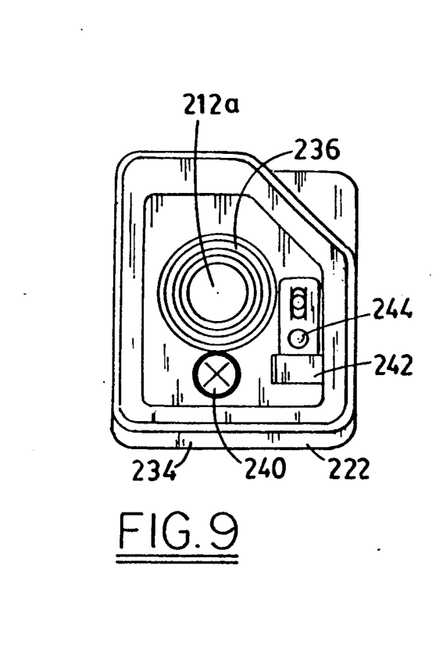
FIG. 9 is a rear view of the plate shown in FIG. 8.

The plate 220 is also shown in FIGS. 8 and 9. A flared seal (expandable slits 240) provides the opening 202 through which the Allen's head wrench 126 may be inserted for manually tightening and loosening the set screw 120. The plate 220 therefore provides a seal which prevents debris or other material in the mixing tank from entering the check mechanism.

Figure 10:
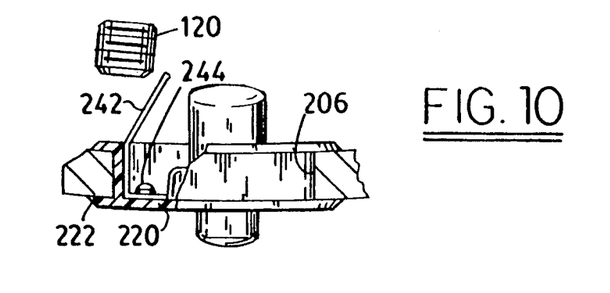
FIG. 10 is a top view of the plate broken away to illustrate the noisemaking clapper which is installed therein.

As a safety feature in order to warn the operator that the set screw has not been fully tightened a noise maker in the form of a spring clapper 242 is attached to the inside of the plate as by rivets 244. The clapper spring will be engaged by the set screw, if it has not been fully tightened to lockingly engage with the shaft. Then the clapper emits noise warning the operator that the mixer should be stopped and the set screw retightened. The clapper may be mounted on the housing 20 rather than on the plate 220, if desired.

Figure 15:
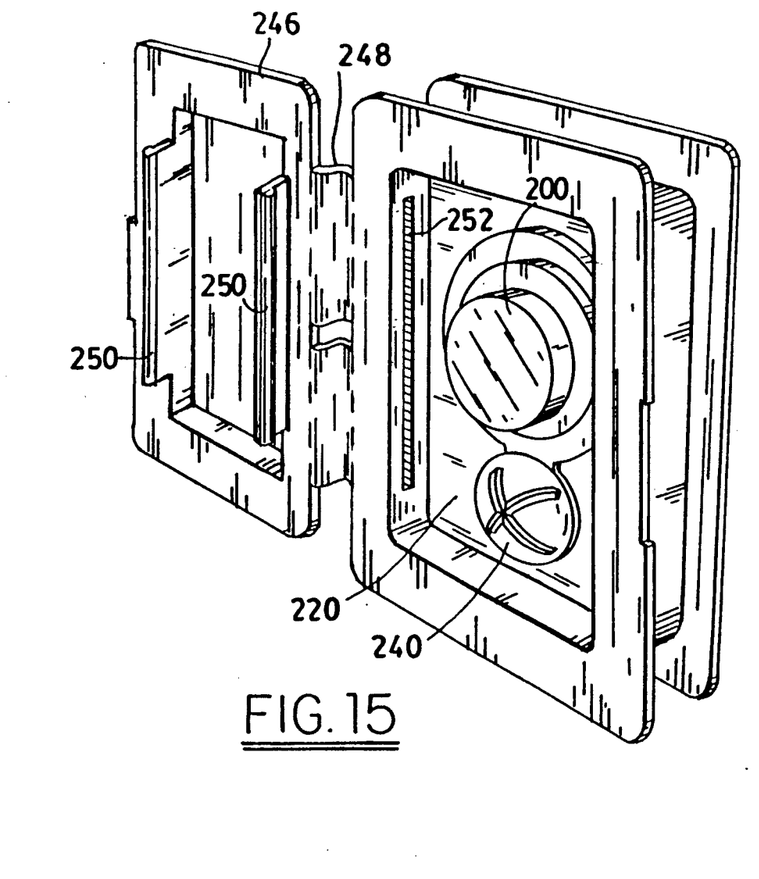
FIGS. 15 and 16 are perspective views illustrating a plate of the type shown in FIGS. 7 to 9 with a cap hinged thereto.
Figure 16:
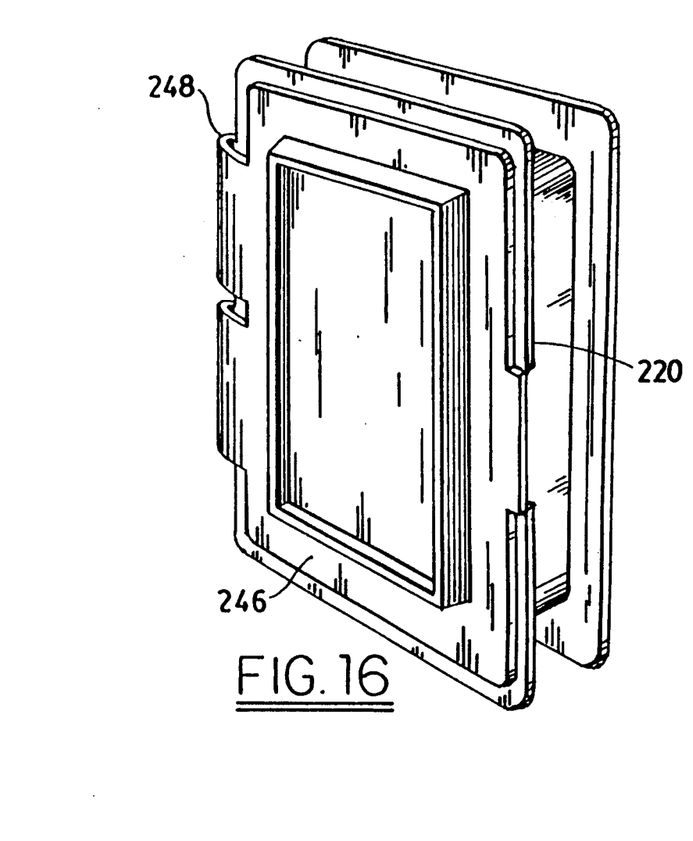

Referring to FIGS. 15 and 16, the plate 220 is shown as a part which has a cover 246 attached thereto by a flexural hinge 248. Snap over ribs 250 are received in indentations 252 so as to cover the indicator 200 and the flare opening 240. The cover 246 provides an additional seal and further assurance against inadvertent actuation of the button/indicator 200.

Figure 12:
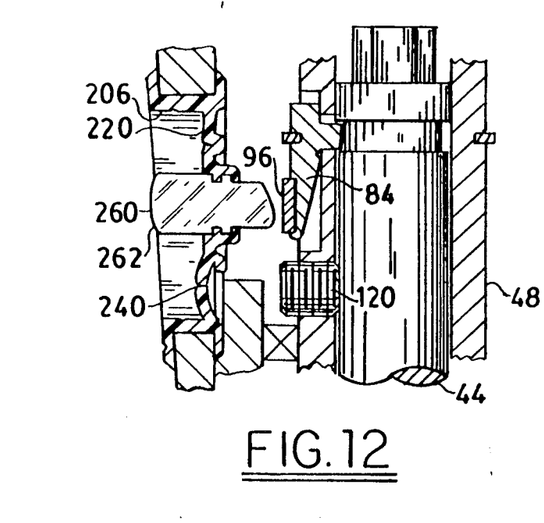
FIG. 12 is a fragmentary sectional view illustrating a chuck mechanism in accordance with another embodiment of the invention.

Referring to FIG. 12 there is shown an optically responsive indicator 260 which is in the form of a generally cylindrical body of transparent material (e.g., PVC or acrylic plastic). The radius outer end 262 provides a lens. The indicator surface 96 is a color disk, for example a disk painted on the surface 96 with green or red fluorescent paint. When the quill 48 and the shaft 44 are in alignment with the indicator 260, the surface 96 becomes clearly visible to the end 262 of the indicator 260. Then the tool may be inserted through the flare opening 240 and the set screw tightened or loosened. The optical indicator body 260 is also flexurally supported by the plate 220 and serves as a button to depress the latch 84 when it is desired to release the shaft 44.

Figure 17:
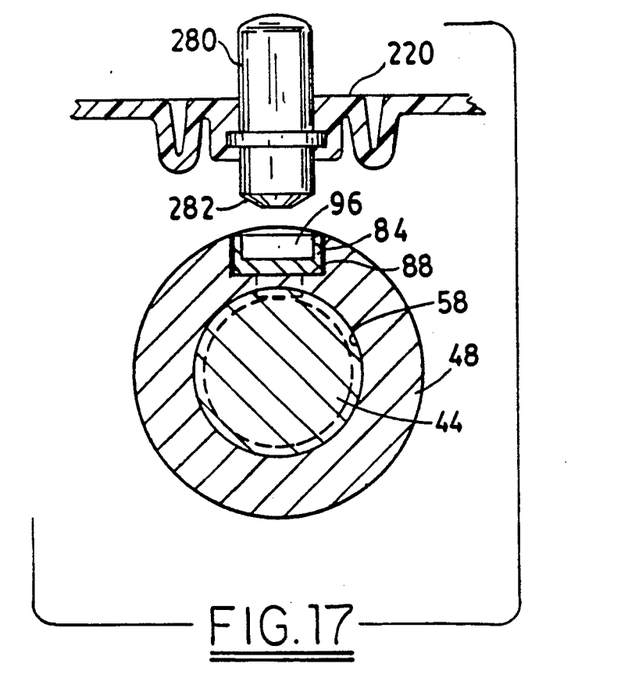
FIG. 17 is a fragmentary sectional view which is taken through the indicator of the chuck mechanism (generally in the plane along the line 17—17 shown in FIG. 7 which illustrates a tactily responsive indicator in accordance with still another embodiment of the invention.

Referring to FIG. 17 there is shown a tactile or feel responsive indicator 280. This indicator is especially suitable for use when the mixer is operated in the dark, for example when processing light sensitive materials, such as photographical materials. The indicator 280 is a generally cylindrical body similar to the indicator 260. It is supported in a flexural plate 220 as was the case for the indicator 260. The inward end 282 is formed with a surface complimentary to the indicator surface 96 of the latch 84. For example, the end 82 may be a protuberance which matches into a recess in the surface 96. Then the operator can tactily determine when the quill 48 and the shaft 44 are in alignment with the indicator 280. A tool can then be inserted through the opening 202 for tightening or loosening the set screw to assemble the shaft and quill in locked relationship or to release the shaft. Then further depression of the indicator 280 will pivot the latch 84 and enable the shaft 44 to be released.

From the foregoing description it will be apparent that there has been provided an improved mixer apparatus, and particularly improved chuck mechanisms therefor. While several embodiments have been described, variations and modifications thereof, within the scope of the invention, will undoubtedly suggest themselves to those skilled in the art. Accordingly, the foregoing description should be taken as illustrative and not in a limiting sense.

I claim:

1. A chuck mechanism for assembling a mixer impeller shaft with a mixer drive which comprises a housing, a quill having an opening for receiving said shaft rotatably mounted in said housing and connected in driving relationship with said mixer drive, a latch engagable with said mixer shaft when received in said quill opening for retaining said shaft in said quill opening, said latch being pivotally mounted on said quill and presenting an indicator surface facing outside of said quill shaft, manually actuable assembly means in said quill disposed in fixed spatial relationship with said indicator surface, and indicator means mounted in said housing and responsive to said indicator surface for indicating when said quill and said shaft engaged with said latch are disposed in predetermined spatial relationship with said housing for enabling said assembly means to be actuated for assembling said shaft and said quill for conjoint rotation when said quill is driven by said mixer drive.

2. The chuck mechanism according to claim 1 wherein said indictor means is selected from the group consisting of means magnetically responsive to said indicator surface for indicating said alignment, means optically responsive to said indicator surface for indicating said alignment, and means tactily responsive to said indicator surface for indicating said alignment.

3. The chuck mechanism according to claim 1 wherein said latch is a lever having a fulcrum, a spring biasing said lever against said quill with said fulcrum in contact with said quill on the peripheral surface thereof, a tab projecting into said quill opening, said shaft having a rim engagable with said tab for holding said shaft against axial displacement in said quill opening, and said lever being pivotable about said fulcrum to enable said tab to engage and release said rim.

4. The mechanism according to claim 3 wherein said spring is a yieldable ring around said lever and said quill.

5. The mechanism according to claim 4 wherein said shaft has a notch in which said lever is disposed, a hole extending radially from said notch to said opening through which said tab extends.

6. The mechanism according to claim 3 further comprising manually actuable means extending through said housing for pivoting said lever to release said tab from said rim.

7. The mechanism according to claim 6 wherein said manually actuable release means is provided by said indicator means.

8. The mechanism according to claim 1 wherein said manually actuable assembly means is in axial alignment with said latch.

9. The mechanism according to claim 8 wherein said housing has an opening there through in radial alignment with said assembly means for the passage of an assembly tool.

10. The mechanism according to claim 9 wherein said assembly means is a set screw threadedly mounted in sail quill, said set screw being manually actuable with said tool.

11. The mechanism according to claim 1 wherein said housing has an annular groove in the inner periphery thereof around a portion of said quill, said portion containing said latch, said indicator means including a radially movable member extending into said annular groove, opposite to said indicator surface.

12. The mechanism according to claim 11 wherein said housing has an opening therein extending into said groove through which a tool is insertable into engagement with said latch for pivoting said latch to release said shaft.

13. The mechanism according to claim 11 wherein said housing has a passageway extending into said annular groove, a flexural member mounted in said passageway, said indicator member being movably mounted on said flexural member biased to a position away from said quill and being movable into engagement with said lever for pivoting said lever for releasing said shaft.

14. The mechanism according to claim 13 wherein said flexural member has at least one slot defining a sealable opening for insertion of a tool for actuating said means.

15. The mechanism according to claim 14 wherein said sealable opening is provided by at least a pair of said slots which define a flare opening.

16. The apparatus according to claim 1 wherein said manually actuable assembly comprises a member movable radially inward of said quill into said opening to engage said quill and shaft and protrudes from said quill when out of engagement with said shaft with each other, audible alarm means fixedly mounted in said housing having a clapper member engagable with said assembly means member where it is out of engagement with said shaft and protruder from said quill.

17. The apparatus according to claim 16 wherein said assembly means member is a set screw threadedly mounted in said quill.

18. The mechanism according to claim 11 further comprising bearing means in said housing disposed above and below said annular groove, said quill being rotatably supported in said bearing means, and seals between each of said bearing means and said annular grooves.

19. The mechanism according to claim 3 wherein said shaft has an annular groove defining said rim along the upper end thereof, said tab projecting into said groove, a socket in said quill for receiving the upper end of said shaft in driving relationship, said upper end of said shaft being spaced from said socket a sufficient distance to provide clearance for the said tab to rotate out of said groove to release said shaft when said tab shaft is displaced axially upward to a position against said socket, thereby guarding against inadvertent release of the shaft.

20. The mechanism according to claim 19 further comprising a pin extending diametrically through said quill and said socket said socket being of a diameter smaller than said opening in said quill and being floatingly supported by said pin for limited movement radially of said quill along said pin.

21. The mechanism according to claim 1 wherein said mixer has a motor connected to said housing and connected in driving relationship with said quill, said housing having a flange, a pivot assembly having a clamp, a first bracket mounted on said claim for rotation about a generally vertical axis, a second bracket mounted on said first bracket for rotation about a generally horizontal axis, said bracket having a mounting yoke with an opening therein receiving said housing therein with said flange resting thereon, said housing depending from said yoke, and said shaft depending from said housing when received in said opening of sail quill.

22. The chuck mechanism according to claim 2 wherein said indicator means is said magnetically responsive indicator, said latch having a first body of permanent magnet material providing said indicator surface, a tube having closed opposite ends and having an axis mounted in said housing with said axis along a radial line intersecting said body, one of said closed ends facing said first body, a member freely movable in said tube along the axis thereof said cylinder, a second body of permanent magnet material connected to said freely movable member at one of the opposite ends of said member facing said one closed end of said tube, a third body of soft magnetic material in said tube fixed to said closed end thereof for attracting said second magnet body to said closed end of said tube, the other of said closed ends of said tube being optically transmissive, the other of said ends of said member having an indicator surface, which is not distinctly visible when said member is magnetically attracted to said body of soft magnetic material, and said second magnetic body being polarized opposite to said first body in the direction of the axis of said tube for magnetically repelling said member and making said indicator surface distinctly visible through said other of said closed ends of said tube.

23. The mechanism according to claim 22 wherein said housing has an opening opposite to said latch, a member of elastomeric material flexurally supporting said tube, said tube providing a manually actuable button for pivoting said latch to release said shaft when said one closed end of said tube is moved along said axis when said member is magnetically repelled indicating adjustment of said tube and said latch.

24. The chuck mechanism according to claim 2 wherein said indicator means is said means optically responsive to said indicator surface and comprises a rod of optically transmissive material having opposite ends inward and outward of said housing mounted in said housing in axial alignment with a plane in which said indicator surface of said latch rotates with said quill so that said indicated surface is visible at said outward end of said rod.

25. The mechanism according to claim 24 further comprising an opening in said housing, a member of elastomeric material flexurally mounting said optically transmissive rod for movement radially toward and away from said latch for engaging said latch at the inward end thereof and pivoting said latch when said indicator surface is visible from said outward end of said rod.

26. The mechanism according to claim 2 wherein said indicator means is said tactily responsive means and comprises a rod having surfaces inwardly and outwardly disposed of said housing at opposite ends of said rods, means yieldably supporting said rod in said housing for movement radially toward and away from said indicator surface of said latch, said inward end of said rod and said indicator surface having complimentary surface characteristics which match when said rod is engaged with said indicator surface for detecting the alignment of said latch and said rod.

27. The mechanism according to claim 26 wherein said housing has an opening, a body of elastomeric material mounted in said opening, flexurally supporting said rod and providing said yieldable supportable means.

28. The mechanism according to claim 1 further comprising a socket having an axial opening therein with internal flats extending parallel to the axis of said opening, a head on said shaft having an external periphery with flats corresponding to said internal flats and receivable into said opening, means for aligning said flats on said head with said internal flats which comprises a plurality of tapered teeth on one of said head and socket moving said internal and external flats into alignment with each other.

29. The mechanism according to claim 28 wherein said teeth are on said socket and extend from each of said flats away from said socket.

30. In a chuck mechanism having a shaft with a head having external flats and a socket with internal flats defining an opening therein for receiving said shaft head, a mechanism for self-alignment of said socket and shaft which comprises tapered teeth extending from said socket against which said external flats abut and are moved into alignment with said internal flats.

* * * * *